US005451739A

United States Patent [19]

Nemchinsky et al.

[11] Patent Number: 5,451,739

[45] Date of Patent: Sep. 19, 1995

[54] ELECTRODE FOR PLASMA ARC TORCH HAVING CHANNELS TO EXTEND SERVICE LIFE

[75] Inventors: Valerian Nemchinsky; Rue A. Lynch, both of Florence, S.C.

[73] Assignee: Esab Group, Inc., Florence, S.C.

[21] Appl. No.: 293,685

[22] Filed: Aug. 19, 1994

[51] Int. Cl.[6] .............................................. B23K 10/00

[52] U.S. Cl. .......................... 219/121.51; 219/121.52; 219/121.48; 219/119; 219/121.49; 313/231.21

[58] Field of Search ................... 219/121.52, 118, 119, 219/75, 121.49, 121.51, 121.5; 313/231.21, 231.31, 231.41

[56] References Cited

U.S. PATENT DOCUMENTS 3,450,926 6/1969 Kiernan .
3,562,486 2/1971 Hatch ............................ 219/121.51
4,782,210 11/1988 Nelson et al. .
4,902,871 2/1990 Sanders et al. .
5,023,425 6/1991 Severance, Jr. .
5,124,525 6/1992 Severance, Jr. et al. .
5,296,668 3/1994 Foreman et al. ............... 219/121.48

*Primary Examiner*—Mark H. Paschall
*Attorney, Agent, or Firm*—Bell, Seltzer, Park & Gibson

[57] ABSTRACT

An electrode and method of operating a plasma arc torch is provided which extends the useful service life of the torch. The electrode includes an elongate tubular holder defining a longitudinal axis and having a discharge end. An endwall closes the discharge end and includes an emissive insert. In one embodiment, the endwall also includes an annular sleeve which separates the insert from physical contact with the holder. Channels formed in the discharge end of the electrode direct a portion of a swirling vortex of gas across the surface of the endwall. The swirling vortex of gas removes products of erosion of the insert and adjacent portion of the sleeve such that the likelihood that arcing will transfer from the insert to the sleeve and/or holder is reduced, and the useful service life of the nozzle-electrode pair is thereby extended.

18 Claims, 2 Drawing Sheets

ELECTRODE FOR PLASMA ARC TORCH HAVING CHANNELS TO EXTEND SERVICE LIFE

FIELD OF THE INVENTION

The present invention relates to plasma arc torches, and more particularly to an electrode for a plasma arc torch which has improved service life.

BACKGROUND OF THE INVENTION

Plasma arc torches are commonly used for the working of metals, including cutting, welding, surface treatment, melting, and annealing. Such torches include an electrode which supports an arc which extends from the electrode to the workpiece in the transferred arc mode of operation. It is also conventional to surround the arc with a swirling vortex of gas, and in some torch designs it is conventional to also envelope the gas and arc with a swirling jet of water.

The electrodes used in conventional torches typically include an elongate tubular holder composed of a material of high thermal conductivity, such as copper or a copper alloy. One such electrode is disclosed in U.S. Pat. No. 5,023,425 to Severance, Jr., and assigned to the assignee of the present invention. The forward, or discharge, end of the electrode includes an endwall having an emissive insert embedded therein which acts as the cathode terminal for a plasma arc. The insert is composed of a material which has a relatively low work function, defined in the art as the potential step, measured in electron volts, which permits thermionic emission from the surface of a metal at a given temperature. In view of its low work function, the insert readily emits electrons in the presence of an electrical potential. Commonly used insert materials include hafnium, zirconium, tungsten, and alloys thereof.

During operation, the copper holder oxidizes and consequently its work function decreases. Unless discouraged, the plasma arc will soon prefer to attach to the oxidized holder rather than the emissive insert. Once the arc attaches to the holder, the copper oxide and the supporting copper melt and the electrode is rapidly destroyed. To extend the service life of the electrode, an annular sleeve may be introduced to separate the insert from physical contact with the holder. The sleeve is composed of a material resistant to oxidation and having a work function greater than the insert. Because the sleeve resists oxidation and has a relatively high work function, it is a poor emitter. Thus, the likelihood that the arc will transfer from the insert to the sleeve and/or holder is reduced and the useful service life of the electrode is extended.

Nevertheless, a significant problem remains which adversely affects the service life of a plasma arc torch. Specifically, the emissive insert and adjacent portion of the sleeve tend to erode rather quickly. Initially, the surface of the endwall is circular and generally planar. As the torch operates, however, erosion of the insert and adjacent portion of the sleeve leads to the creation of a cavity in the surface of the endwall. In order to attach the insert, the arc must dive into this cavity, thus increasing the arc length. Because plasma is not a perfect conductor, but has a finite conductivity, the elongated arc demands additional voltage. In accordance with Ohms' law, the resistance of the additional length of plasma conductor results in a corresponding voltage drop as the depth of the cavity increases.

The resultant additional voltage is applied between the holder and the insert. The longer the torch operates, the higher the voltage becomes until eventually the additional voltage drop is sufficient to overcome the disadvantage of attachment to the higher work function materials and the arc transfers from the insert to the sleeve and/or holder. The result of double arcing from the sleeve and/or holder is rapid erosion of the electrode which can lead to double arcing and rapid destruction of the nozzle-electrode pair. It is also believed that during operation, erosion products from the insert are deposited on the sleeve and holder, thus reducing their work functions and increasing the likelihood of double arcing.

It is accordingly an object of the present invention to provide an electrode and method of operating a plasma arc torch which improves the useful service life of the torch.

It is another object of the present invention to provide an electrode for a plasma arc torch which reduces the likelihood of the occurrence of double arcing, thereby preventing destruction of the nozzle-electrode pair.

It is a more particular object of the present invention to provide an electrode having channels formed therein for directing a portion of a swirling gas into the cavity created in the endwall of the electrode by erosion of the insert and adjacent portion of the sleeve, thereby widening the cavity and reducing the additional voltage drop at the electrode. Furthermore, this directed flow of the gas will remove the erosion products from the sleeve and the holder making these parts less conducive to arcing.

SUMMARY OF THE INVENTION

The above and other objects and advantages of the present invention are achieved in the embodiments illustrated herein by the provision of an electrode and method for improving the useful service life of a plasma arc torch. The electrode and method for extending the useful service life of the torch include an electrode adapted for supporting a plasma arc. The electrode includes an elongate tubular holder defining a longitudinal axis and having a discharge end. A plurality of channels formed in the discharge end of the holder define a corresponding plurality of gas passageways for a purpose to be described herein.

The discharge end of the electrode is closed by an endwall which has an opening extending axially at least partially therethrough. A centrally located emissive insert is embedded in the opening of the endwall and acts as a cathode for transferring the arc to a workpiece. Preferably, the opening of the endwall further includes an annular sleeve which separates the insert from physical contact with the holder. Prior to operation of the torch, the insert and the annular sleeve together define the circular, generally planar surface of the endwall at the discharge end of the electrode.

The torch is operated so that a plasma arc extends from the insert to a workpiece. During operation, the insert and adjacent portion of the sleeve are expended and converted to products of erosion, thereby forming a cavity in the endwall of the electrode. A swirling vortex of gas is introduced around the outside of the holder and is directed axially in the direction of the discharge end of the electrode. A portion of the swirling gas stream is directed along the channels formed in the discharge end of the holder and across the surface of the endwall. The portion of the gas stream directed across the surface of the endwall widens the cavity formed by erosion and removes the products of erosion of the insert and adjacent portion of the sleeve. As a result, the likelihood of the plasma arc transferring from the insert to the sleeve and/or holder is reduced and the useful service life of the nozzle-electrode pair is extended.

The holder is composed of a thermally conductive material preferably selected from the group consisting of copper and copper alloys. The insert is composed of a material having a relatively low work function preferably selected from the group consisting of hafnium, zirconium, tungsten and alloys thereof. The sleeve is composed of silver, gold, platinum, rhodium, iridium, palladium, nickel and alloys thereof. The sleeve has a relatively high work function which is greater than the work function of the insert.

BRIEF DESCRIPTION OF THE DRAWINGS

Some of the objects and advantages of the present invention having been stated, others will appear as the description proceeds when considered in conjunction with the accompanying drawings, in which.

DETAILED DESCRIPTION OF THE PREFERRED EMBODIMENTS

Figure 1:
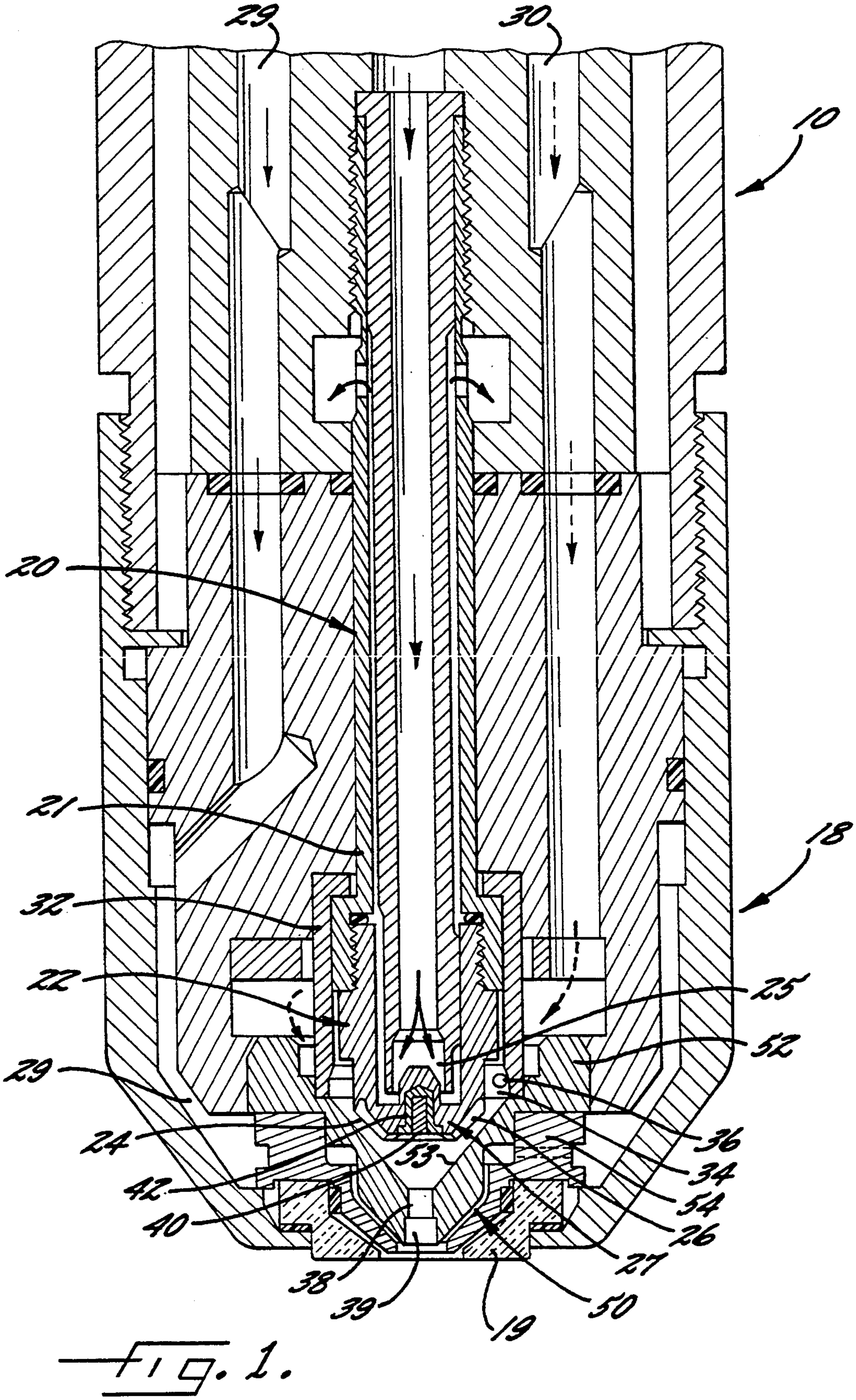
FIG. 1 is a sectioned side elevation view of one embodiment of a plasma arc torch according to the present invention.
Figure 2:
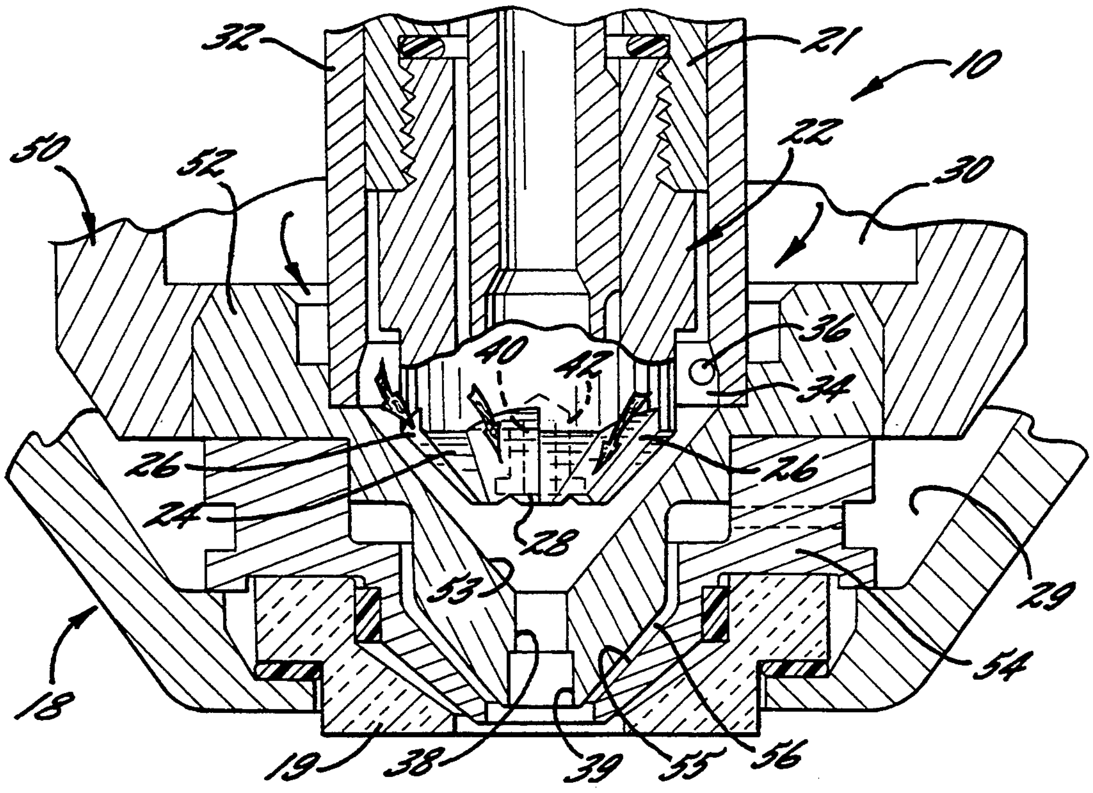
FIG. 2 is a detailed, partially sectioned view of the discharge end of the electrode of the torch shown in FIG. 1.

Referring more particularly to the drawings, FIGS. 1 and 2 illustrate one embodiment of a plasma arc torch which is adapted to be operated in accordance with the electrode and method of the present invention. The torch of FIG. 1 is further illustrated and described in U.S. Pat. No. 5,124,525 to Severance Jr., and assigned to the present assignee, the disclosure of which is expressly incorporated herein by reference. Other embodiments of torches suitable for use with the present invention are illustrated in U.S. Pat. No. 4,311,897 to Yerushalmy and U.S. Pat. No. 5,097,111 to Severance, Jr., and assigned to the present assignee.

The torch 10, as illustrated in FIG. 1, includes an electrode 20 comprising an elongate tubular holder 22 defining a longitudinal axis. The holder 22 is thermally conductive and is typically composed of a metallic material, preferably copper or copper alloy. The holder comprises a discharge end 24, which has a frustoconical exterior surface in the illustrated embodiment and a plurality of channels 26 formed therein (FIG. 2). The holder 22 is threaded onto an internally-threaded upper portion 21 of electrode 20. Upper portion 21 is in turn threadably secured to the body of torch 10. The holder 22 is open at its upper end so that the holder is cup-shaped and defines an internal opening 25. Discharge end 24 comprises a transverse endwall 27 (FIG. 3) which closes the lower end of holder 22. Initially, the surface 28 of endwall 27 is circular and generally planar. However, as will be described, during operation of the torch a portion of the surface 28 of endwall 27 erodes and a cavity is formed which begins at the center of the endwall and extends outwardly in the direction of the holder 22.

Torch 10 also includes a nozzle 50. Nozzle 50 comprises an upper nozzle member 52, a lower nozzle member 54 and an insulator 19. A nozzle retaining cup 18 circumscribes electrode 20 and nozzle 50. Nozzle retaining cup 18 threadably engages the exterior periphery of torch 10 such that nozzle 50 and electrode 20 are retained in position and the components of torch 10 are protected.

Upper nozzle member 52 is composed of a metallic material, typically copper or copper alloy, and includes a substantially cylindrical body portion. The interior of the cylindrical body portion defines a frustoconical surface 53 which tapers radially inward in a direction substantially parallel to the frustoconical exterior surface of discharge end 24 of electrode 20, and converges at cylindrical arc constricting bore 38. The frustoconical surface 53 generally conforms to and is spaced from the frustoconical surface of discharge end 24 so as to define a gas passage therebetween. Frustoconical surface 53 constricts the plasma arc during operation of the torch by directing the swirling vortex of gas which surrounds the electrode radially inward toward arc constricting bore 38. Frustoconical surface 53 also directs a portion of the swirling gas along channels 26 and across surface 28 of endwall 27 for a purpose which will described.

Lower nozzle member 54 also includes a substantially cylindrical body portion formed of a metallic material, preferably a free cutting brass. The interior of the body portion defines a frustoconical surface 55 which is offset from the outer surface of upper nozzle member 52 such that a downwardly tapered water passage 56 is formed between the two surfaces. Water passage 56 directs water between the nozzle-electrode pair radially inward in a direction away from the discharge end 24 of electrode 20 such the water converges at the exit end of bore 38.

Ceramic insulator 19 is secured onto lower nozzle member 54 and extends substantially along its entire outer surface. Insulator 19 prevents double arcing and insulates the lower nozzle member 54 from heat and plasma generated during operation of the torch.

In the illustrated embodiment, the torch 10 comprises a liquid passageway 29 for circulating a liquid cooling medium, such as water, through the torch body between electrode 20 and nozzle 50. For many applications liquid cooling is not required, and the present electrode and method is intended to be suitable for use with embodiments which do not comprise a liquid passageway.

A gas such as oxygen is supplied to the torch body through gas passageway 30. Gas passageway 30 directs the gas from a suitable source (not shown) through a conventional gas baffle 32 into a gas plenum chamber 34 via inlet holes 36. The inlet holes 36 are arranged so as to cause the gas to enter the plenum chamber 34 in a swirling manner as is well-known in the art. The gas flows out of the plenum chamber 34 through the arc constricting bore 38 out the opening in lower bore section 39 and past insulator 19 in the direction of the workpiece (not shown).

Figure 3:
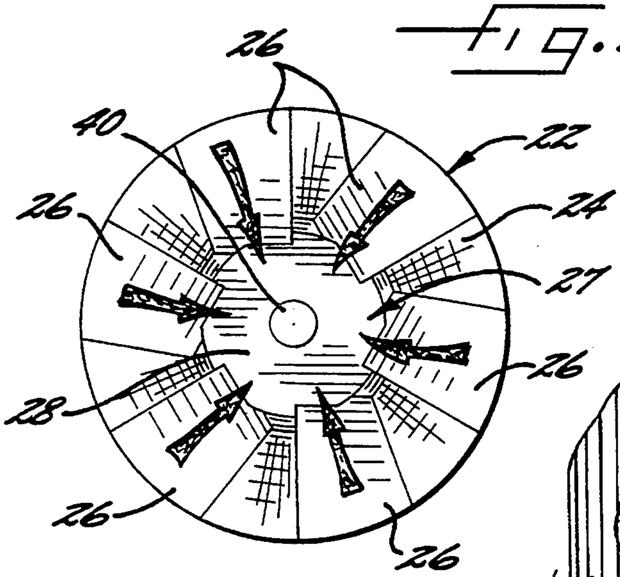
FIG. 3 is an end view of the electrode of FIG. 2 showing the plurality of channels formed in the discharge end of the holder, and the insert and the annular sleeve embedded in the endwall.

As shown in FIGS. 2 and 3, endwall 27 is contained within the inner periphery of holder 22 and closes the discharge end 24 of electrode 20. An emissive insert 40 is mounted in a conventional manner at the center of endwall 27 (FIG. 3), and is disposed coaxially about the longitudinal axis of the electrode 20. An annular sleeve 42 is disposed coaxially about insert 40 and separates the insert from physical contact with holder 22. Together, the exposed surfaces of insert 40 and sleeve 42 define surface 28 of endwall 27.

Insert 40 is composed of a material having a relatively low work function, preferably in the range between about 2.7 to about 4.2 electron volts. The work function of a material is defined in the art as the potential step, measured in electron volts, which permits thermionic emission from the surface of a metal at a given temperature. Typical examples of materials used as an insert include hafnium, zirconium, tungsten and alloys thereof. Accordingly, the insert 40 readily emits electrons in the presence of an electrical potential, and is therefore suitable for acting as the cathode terminal of a plasma arc torch.

The sleeve 42 is composed of a relatively non-emissive material having a relatively high work function which is greater than that of the insert 40, and also preferably greater than that of the holder 22. In this manner, sleeve 42 acts to discourage the arc from transferring from the insert to the sleeve and/or holder. It is preferred that the sleeve 42 be composed of a material having a work function of at least 4.3 electron volts. Thus, ideally the sleeve will be composed of an alloy comprising metals selected from the group consisting of silver, gold, platinum, rhodium, iridium, palladium, nickel and alloys thereof. A further description of the insert 40 and the sleeve 42 may be found in U.S. Pat. No. 5,023,425 to Severance, Jr., and assigned to the assignee of the present invention.

In some applications the gas may be introduced into the torch so as to impart an axial flow. Under such conditions, the insert 40 is preferably made flush with the forward edge of the discharge end 24 of holder 22. However, the gas may be introduced into the torch such that a swirling, or vortex flow is achieved. Under such a condition, it is preferred that insert 40 and sleeve 42 be recessed from the forward edge of discharge end 24 for minimum electrode erosion.

In operation, a plasma arc is struck between insert 40, acting as the cathode, and a workpiece (not shown) which serves as the anode. While the invention is primarily directed to an improved cathode structure for direct current operation, it should be understood that the invention is also useful for alternating current power. It is also to be understood that the electrode and the method of the invention may be used in a torch which operates either transferred or non-transferred. In any case, the torch is useful for cutting, welding, surface treatment, melting, and annealing of metals.

As the torch operates, insert 40 and the adjacent portion of sleeve 42 are expended and converted into products of erosion. As a result, a cavity is created in surface 28 of endwall 27. Without the gas channels 26, the cavity would begin at the insert and spread very little radially towards the inner periphery of the holder 22 as the depth of the cavity increased. Due to the corresponding increase in arc length, the voltage increases with the cavity depth. As well, erosion products accumulate on the end of the holder and on the sleeve. Accordingly, arcing from the sleeve and/or holder becomes more likely. When the arc attaches the sleeve 42 and/or holder 22, the electrode rapidly erodes and the nozzle-electrode pair is destroyed.

To extend the useful service life of the torch, a portion of the swirling vortex of gas is directed along the channels 26 formed in discharge end 24. In the illustrated embodiment, frustoconical surface 53 assists in directing the flow of swirling gas along the channels. It is believed, however, that the effect of the shape of the interior surface of upper nozzle member 52 is minimal. Thus, it is possible to provide other shapes, such as cylindrical or hemispherical, for the interior surface of upper nozzle member 52 without adversely affecting the amount of the flow of swirling gas which is directed along the channels 26. It is suspected that the primary factor which controls the amount of flow directed along the channels is the swirling action of the gas flow.

The precise shape and angle of the channels 26 have also been found to have little influence on electrode life. The channels 26 in the discharge end 24 of the electrode 20 in the illustrated embodiment are formed by a conventional small radius milling tool. Thus, the shapes of the entrance and the exit of the channels 26 are primarily determined by the frustoconical angle of discharge end 24. The frustoconical discharge end 24 in the example is about 45°. It is not believed, however, that this angle is a critical dimension. Indeed, the electrode may have other shapes.

Figure 4:
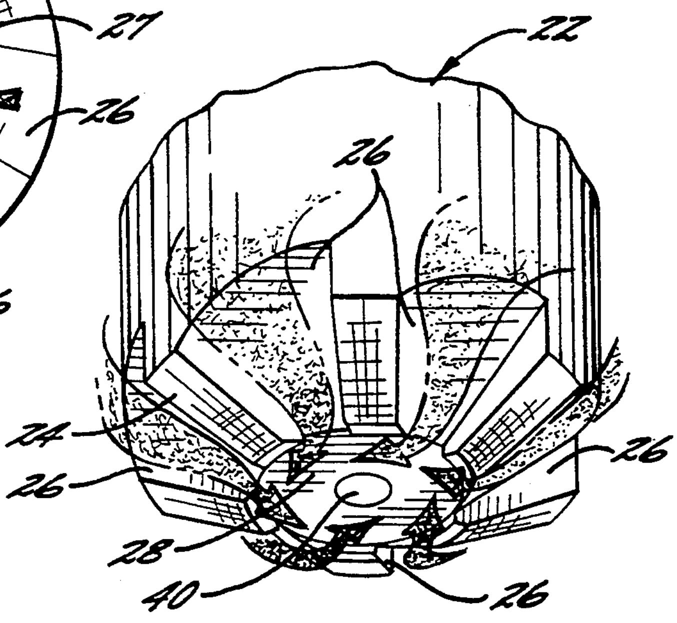
FIG. 4 is a perspective view of the discharge end of the electrode of FIG. 2 illustrating the paths of the portion of the swirling gas which is directed along the channels and across the surface of the endwall.

Regardless of the shape and frustoconical angle of the channels 26, they define a plurality of passageways for directing a portion of the swirling gas stream across the surface 28 of endwall 27. As shown in FIG. 4, the portion of the gas stream directed along channels 26 is divided into a corresponding plurality of independent gas streams which converge to form a swirling vortex across surface 28 of endwall 27. The swirling vortex acts to continuously remove the products of erosion of the insert 40 and adjacent portion of sleeve 42 so as to maintain the cavity created in surface 28 of endwall 27 generally wider and free from erosion deposits. In this manner, the likelihood of the arc transferring from the insert to the sleeve and/or holder is reduced and the useful service life of the torch is extended.

In the drawings and specification, there has been set forth a preferred embodiment of the invention, and although specific terms are employed, they are used in a generic and descriptive sense only and not for purposes of limitation. Many variations of the examples of the invention set forth in the description and the drawings will be apparent to those skilled in the art. Accordingly, it is intended that the description of the invention provided be construed as broadly as possible to include all such variations which will be known to those skilled in the art.

That which is claimed is:

1. A method of extending the useful service life of an electrode adapted for supporting an arc in a plasma arc torch, the electrode comprising a tubular holder defining a longitudinal axis and having a discharge end closed by an endwall, the endwall comprising an emissive insert to act as a cathode for transferring the arc to a workpiece, said method comprising the steps of:

operating the torch so that a plasma arc extends from the emissive insert to a workpiece;

introducing a gas stream around the outside of the electrode with the gas stream moving axially in the direction of the discharge end of the holder; and directing a portion of the gas stream along a plurality of open channels formed in the holder which terminate adjacent the endwall and radially inwardly across the endwall so as to remove products of erosion and to thereby maintain the endwall substantially free of erosion deposits.

2. The method as defined in claim 1 wherein the insert is separated from physical contact with the holder by an annular sleeve composed of a material having a work function greater than the work function of the insert.

3. An electrode adapted for supporting an arc in a plasma arc torch and comprising:

a tubular holder defining a longitudinal axis and comprising a discharge end;

an endwall closing the discharge end of said holder and having an opening formed therein extending axially at least partially therethrough and coaxially with the longitudinal axis defined by said holder;

an emissive insert mounted within the opening; and a plurality of open channels formed in the holder which terminate adjacent said endwall, whereby said channels define a corresponding plurality of passageways for directing a portion of a stream of gas along said channels and radially inwardly across said endwall.

4. The electrode of claim 3 wherein said holder comprises a metal selected from the group consisting of copper and copper alloys.

5. The electrode of claim 3 wherein the insert comprises a metal selected from the group consisting of hafnium, zirconium, tungsten and alloys thereof.

6. The electrode of claim 3 wherein said holder is composed of a material having a work function greater than the work function of the insert.

7. The electrode of claim 3 wherein said channels formed in the holder which terminate adjacent said endwall each comprise a pair of opposed sidewalls, at least one of the sidewalls extending along a portion of a radial which intersects the longitudinal axis defined by said holder.

8. The electrode of claim 7 wherein the opposed sidewalls form an acute angle.

9. The electrode of claim 3 wherein said endwall comprises an annular sleeve separating the insert from physical contact with said holder.

10. The electrode of claim 9 wherein the annular sleeve is composed of a material having a work function greater than the work function of the insert.

11. The electrode of claim 9 wherein the annular sleeve is composed of a material having a work function greater than the work function of the insert and greater than the work function of said holder.

12. The electrode of claim 9 wherein the annular sleeve is composed of metals selected from the group consisting of copper, silver, gold, platinum, rhodium, iridium, palladium, nickel and alloys thereof.

13. The electrode of claim 9 wherein the annular sleeve has a radial thickness of at least 0.1 inches.

14. The electrode of claim 3 wherein the discharge end of said holder comprises a frustoconical surface and wherein said channels are formed in said frustoconical surface.

15. A plasma arc torch comprising:

a torch body;

an electrode secured to said torch body, said electrode comprising:

an elongate tubular holder defining a longitudinal axis and comprising a discharge end;

an endwall closing the discharge end and having an opening formed therein extending axially at least partially therethrough and coaxially with the longitudinal axis defined by said holder;

an emissive insert mounted within the opening; and a plurality of open channels formed in the holder which terminate adjacent said endwall;

a nozzle secured to the torch body and having a bore therethrough aligned with the longitudinal axis defined by said holder, the bore positioned opposite the discharge end of said holder for constricting a plasma arc;

means for generating an electrical arc extending from said emissive insert in the direction of a workpiece; and means for generating a flow of gas between said electrode and said nozzle so as to create a plasma flow through the bore of said nozzle in the direction of the workpiece, whereby a portion of the flow of gas is directed by said channels and said nozzle radially inwardly across said endwall to maintain said endwall substantially free of erosion deposits and to thereby extend the useful service life of the torch.

16. The torch of claim 15 wherein said endwall comprises an annular sleeve separating said insert from physical contact with said holder.

17. The torch of claim 15 wherein the discharge end of said holder comprises a frustoconical surface and the bore of said nozzle includes a frustoconical surface which conforms to and is spaced from said frustoconical surface of the discharge end of said holder.

18. The plasma torch as defined in claim 17 wherein said channels are formed in the frustoconical surface of said discharge end of said holder.

* * * * *